Dec. 6, 1949   H. L. LEFEVRE-SELMER   2,490,640
PIPE JOINT
Filed Oct. 28, 1946

Inventor
H. L. Lefevre-Selmer
By Glaser & Downing Teeble
Attys.

UNITED STATES PATENT OFFICE 2,490,640

PIPE JOINT

Henri Léon Lefevre-Selmer, Mantes-la-Ville, France

Application October 28, 1946, Serial No. 706,269
In France January 24, 1945

1 Claim. (Cl. 285—129)

The present invention has for its object to improve the method of assembly of the various parts of the bodies of saxophones and, in general, of all wind instruments of which the bodies are formed by straight and curved tube sections joined together by welding.

Whereas the assembling of the various sections of instruments of this kind is at present effected solely by means of welded sleeves, the device according to the invention has no weld. This device can be taken apart and re-assembled indefinitely and thereby allows of easy access, checking and polishing of the inside and outside of the finished bodies, as in a straight instrument.

The invention essentially consists in effecting the assembly by means of a sleeve provided with screw clamping means, which is arranged so as to clamp the abutting ends of the two sections to be assembled. According to the embodiment adopted, said ends are provided with rims, crimpings, flanges, etc., projecting from the outer wall of the bodies, which co-operate with the sleeve for obtaining the assembly and are concealed in a recess provided on the periphery of the inner face of said sleeve.

The device according to the invention is illustrated by way of example in the accompanying drawing.

Figure 1:
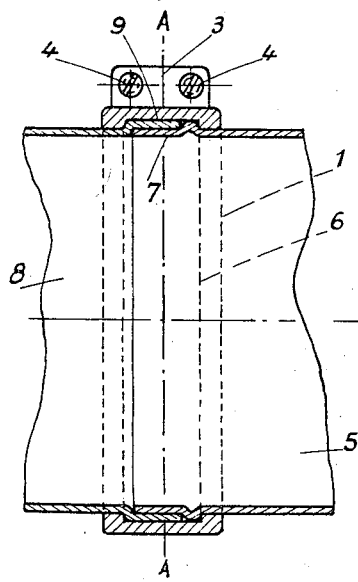
Fig. 1 is a sectional view of two abutting sections and of the assembling sleeve.
Figure 2:
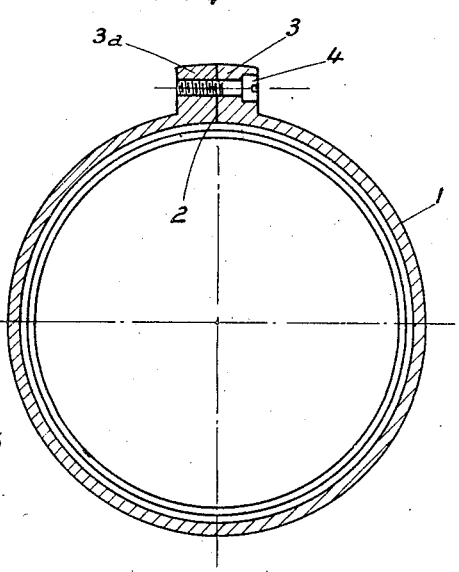
Fig. 2 is a view in section along the line A—A of Fig. 1.

The device (Figs. 1 and 2) comprises a sleeve or collar 1 which is split in two and provided with two bosses 3, 3a which receive the tightening screws 4.

The element 5 is crimped at its end so as to form a rim 6 and beyond said rim an engaging surface 7; the other element 8 is itself crimped to form a bearing surface 9 in which the surface 7 of the element 5 is frictionally engaged. The sleeve 1 is recessed on the inside to house the two bearing surfaces 7 and 9 and the rim 6.

Figure 3:
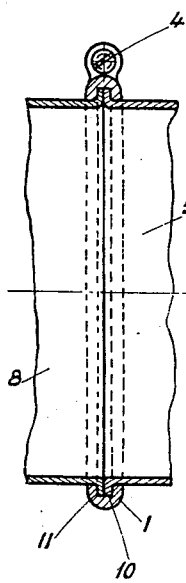
Figs. 3, 4 and 5 are sectional views relating to variants of the embodiment shown in Fig. 1.

In the embodiment shown in Fig. 3, flanges 10 and 11 are respectively formed at the ends of the elements 5 and 8 by a right angle bend obtained by crimping said ends; as in the previous embodiment, the sleeve 1 fits over the two flanges 10 and 11 which are housed in the recess of the inner face of the sleeve.

Figure 4:
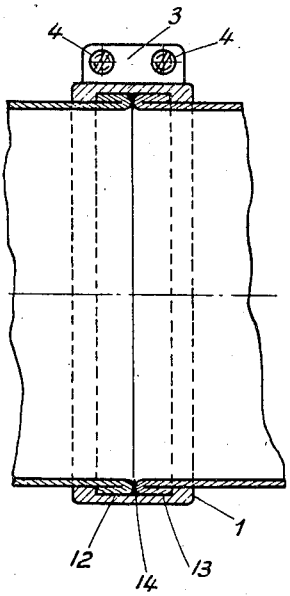

In the embodiment shown in Fig. 4, the ends of the elements 5 and 8, instead of being bent back at right angles to form flanges, are bent back on themselves to form portions of extra thickness 12 and 13 over which the sleeve 1 fits in the same manner and which are housed in the recess of said sleeve; since the bearing surfaces of the two elements on one another is smaller than in the previous embodiments described, a sealing ring 14 of plastic material may be interposed in the joint.

Figure 5:
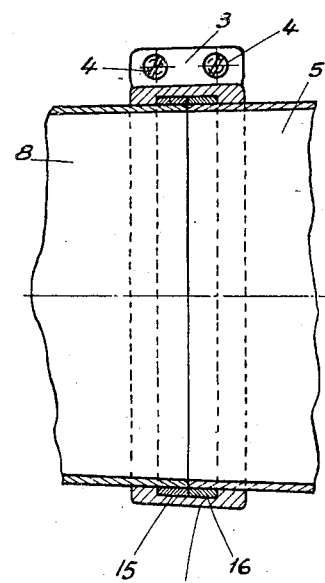

The embodiment shown in Fig. 5 only differs from the previous one by the fact that the extra thick portions of the ends, instead of being formed by folds of the metal, obtained by crimping, are formed by rings 15, 16 fixed by welding on said ends.

The device according to the invention, in addition to its ease of taking apart and of re-assembling, which is the essential feature, has the important advantage of not breaking the conicity of the tubes to be joined, as would be the case of an assembly with a sliding engagement such as is provided in wind instruments with bodies that can be taken apart, while ensuring a perfect concentricity of the assembly and a positive joint without possibility of play.

I claim:

In a musical wind instrument, mainly of the saxophone type, the body of which comprises a number of tubular metal elements assembled together in consecutive relation, a device for assembling two contiguous elements which comprises a peripheral deformation in relief of the end of one of said elements, a peripheral rib in relief located near the end of the other element, and a split ring or sleeve provided with screw clamping means and having on the periphery of its inner face a recess which fits and clamps the portions in relief of the ends of said elements, formed by the rib of one of said elements and by the peripheral deformation of the other element fitted over the other element between the end of said other element and its peripheral rib.

HENRI LÉON LEFEVRE-SELMER.

REFERENCES CITED

The following references are of record in the file of this patent:

UNITED STATES PATENTS

| Number | Name | Date |
|---|---|---|
| 669,673 | Averbeck | Mar. 12, 1901 |
| 1,043,412 | Faunce | Nov. 15, 1912 |
| 1,644,553 | Trout | Oct. 4, 1927 |

Certificate of Correction

Patent No. 2,490,640                                                                          December 6, 1949

HENRI LÉON LEFEVRE-SELMER

It is hereby certified that error appears in the above numbered patent requiring correction as follows:

In the heading to the printed specification, line 6, foreign filing date, for "January 24, 1945" read *January 24, 1946*; and that the said Letters Patent should be read with this correction therein that the same may conform to the record of the case in the Patent Office.

Signed and sealed this 27th day of June, A. D. 1950.

[SEAL]

THOMAS F. MURPHY,
                                                                             *Assistant Commissioner of Patents.*